United States Patent
Hannestad et al.

(10) Patent No.: US 11,968,608 B2
(45) Date of Patent: Apr. 23, 2024

(54) SYSTEM AND METHOD FOR DEMARKATING SMART AREAS

(71) Applicant: Helbiz Holdings, Inc., New York, NY (US)

(72) Inventors: Jonathan Hannestad, New York, NY (US); Nemanja Stancic, Belgrade (RS); Petar Milovanovic, Belgrade (RS); Salvatore Palella, New York, NY (US)

(73) Assignee: HELBIZ HOLDINGS, INC., New York, NY (US)

( * ) Notice: Subject to any disclaimer, the term of this patent is extended or adjusted under 35 U.S.C. 154(b) by 0 days.

(21) Appl. No.: 17/368,526

(22) Filed: Jul. 6, 2021

(65) Prior Publication Data

US 2022/0078591 A1    Mar. 10, 2022

Related U.S. Application Data

(63) Continuation of application No. 16/673,518, filed on Nov. 4, 2019, now abandoned.

(51) Int. Cl.
| | |
|---|---|
| *H04W 4/50* | (2018.01) |
| *H04W 4/02* | (2018.01) |
| *H04W 4/021* | (2018.01) |
| *H04W 4/80* | (2018.01) |

(52) U.S. Cl.
CPC ............ *H04W 4/50* (2018.02); *H04W 4/021* (2013.01); *H04W 4/023* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2005/0136845 | A1* | 6/2005 | Masuoka | G01S 1/042 455/67.14 |
| 2015/0021113 | A1* | 1/2015 | Lefevbre | B60K 28/00 180/272 |
| 2020/0005566 | A1* | 1/2020 | Jain | G07C 9/28 |
| 2020/0064487 | A1* | 2/2020 | Krzych | H04W 4/33 |
| 2021/0402600 | A1* | 12/2021 | Kim | B25J 9/1666 |

FOREIGN PATENT DOCUMENTS

WO    2018174376 A1    9/2018

OTHER PUBLICATIONS

Extended European Search Report in Corresponding European Application No. 20205277.5 dated Nov. 23, 2020. 6 pages.

* cited by examiner

*Primary Examiner* — Kevin T Bates
*Assistant Examiner* — Emad Siddiqi
(74) *Attorney, Agent, or Firm* — Leason Ellis LLP

(57) ABSTRACT

A method, system and computer readable media for detecting entry of an IoT pack into a geofenced location. The method may begin by broadcasting a Bluetooth inquiry message from a Bluetooth radio that forms a part of an IoT pack. Upon receipt of one or more responses to the inquiry message a Bluetooth radio that forms a part of a given beacon used to demark a geofenced location, the IoT pack energizes an ultra wide band radio that forms a part of the IoT pack and begins sending and receiving ultra wide band signals to an ultra wide band radios that form a part of the given beacon. Ranging information is calculated from the IoT pack to the one or more beacons on the basis of the received ultra wide band signals, which is analyzed to determine the location of the IoT pack relative to the geofenced location.

15 Claims, 8 Drawing Sheets

SYSTEM AND METHOD FOR DEMARKATING SMART AREAS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to tracking the entry of one or more devices into a demarcated geofenced location, referred to herein as a "smart area". In particular, embodiments of the invention relate to the use of hardware beacons to demark the boundaries of a given geographic region such that devices can determine entry into such areas and take appropriate action, if any.

BACKGROUND OF THE INVENTION

There are a number of tracking systems that are presently in use across a variety of contexts. One such use case is in the context of personal transport devices, which may take the form of, for example, electric scooters, e-bikes, etc. Typically, such devices are equipped with hardware such that the personal transport device is addressable, locatable, etc., i.e, turning a "dumb" devices into an IoT endpoint. The current state of the art for tracking the IoT pack on such devices lacks the ability to provide fine-grained, high-resolution information with respect to the exact physical location of the IoT pack or object to which it is affixed. This is particularly a problem vis-à-vis the return of rental personal transport devices that must be returned to a designed return area at the conclusion of a given rental session. Currently, many such rental systems require the user to take a picture of the device within a designated return location, uploading the photo to a server as confirmation that the user has properly returned the device to an authorized location.

Bluetooth is one technology that can be used to determine the location of an IoT pack. For example, where a plurality of Bluetooth transceivers are strategically positioned to cover a large area, the transceivers can track the positions of any discoverable device, recording and sending any data back to a single address. Each Bluetooth transceiver acts like any regular Bluetooth device and searches for every device within range. The resultant location determinations that are made on the basis of the transmission and receipt of Bluetooth signals does not provide fine-grained precision, the result being that the actual, physical location of an IoT pack can be several meters away from the calculated, resultant location determination.

WiFi is another option for determining the location of a device and whether such device is within a geofenced location. Like other solutions, this technology suffers from lack of coverage in rural areas where there are few, if any, WiFi hotspots. Although more useful in urban areas that can take advantage of several areas with densely packed hotspots, there are also security concerns and lack of required levels of precision in the resultant location determinations, again being several meters divorced from the actual, physical location of an object in 3D space.

A third option is the use of GPS, but its use in this context is also problematic. First, since the GPS receiver is constantly communicating with a plurality of satellites, it uses substantially more data and battery life than passive trackers. Architecturally, these devices need constant and direct access to the sky with a line of sight for communication with the GPS satellites; the GPS receiver is unable to perform its location calculations when it is unable to reach the necessary satellites. Finally, for civilian GPS platforms, it is not as accurate as other technologies, e.g., RFID, which can locate a tag in the next room. Moreover, the general public doesn't have access to the precision provide by ultra-accurate military GPS trackers.

Accordingly, new tracking platforms and techniques, particularly hardware and software platforms that define geographic smart areas, tracking objects within and without such areas in a manner that obviates drawbacks associated with the prior art.

SUMMARY OF THE INVENTION

Various embodiments of the present invention are directed towards a systems, methods and computer program products for detecting entry of an IoT pack into a geofenced location. A system in accordance with one embodiment of the present invention comprises a plurality of beacons arranged along the perimeter of a geofenced location, a given one of the plurality of beacons operative to transmit one or more signals, and an IoT pack operative to receive the one or more signals from one or more of the plurality of beacons and determine its location on the basis thereof relative to the geofenced location.

According to one embodiment, a given one of the plurality of beacons comprises a base by which to affix the given beacon to a surface, a durable enclosure that defines an internal volume for the storage of one or more electrical and mechanical components, one or more radio transceivers disposed of within the internal volume of the durable enclosure, and a power source to energize the one or more radios. A given one of the one or more radios may be an ultra wide band radio and, in conjunction with the foregoing, may comprise a Bluetooth radio. The geofenced location defined by the plurality of beacons in one embodiment is a polygon whereby the plurality of beacons are arranged at the vertices of the geofenced location. According to one embodiment the geofenced location is a regular polygon, whereas other embodiments comprise irregular shapes or geographies.

The IoT pack according to one embodiment comprises an ultra wide band radio and is operative to receive one or more ultra wide band signals; it may also comprise a Bluetooth radio. IoT pack may engage the ultra wide band radio in response to the receipt of a response to a Bluetooth inquiry message and disengage the ultra wide band radio after expiration of a timeout period. The IoT pack may further comprise a programmable processor; one or more radio transceivers to receive signals, a storage device, and program code retrievable from the storage device and executable by the programmable processor to determine the location of the IoT pack relative to the geofenced location on the basis of the received one or more signals from one or more of the plurality of beacons. According to some embodiments, the processor executes program code to perform an action in response to determining the location of the IoT pack relative to the geofenced location. More specifically, the processor may execute program code to perform an action in response to determining that the IoT pack has entered the geofenced location.

In addition to the foregoing, embodiments of the present invention are directed towards a method for detecting entry of an IoT pack into a geofenced location. The method in accordance with one embodiment comprises broadcasting a Bluetooth inquiry message from a Bluetooth radio that forms a part of an IoT pack and, upon receipt of one or more responses to the inquiry message from one or more Bluetooth radios that form a part of one or more beacons that are used to demark a geofenced location, energizing an ultra wide band radio that forms a part of the IoT pack and receiving ultra wide band signals from one or more ultra wide band radios that form a part of the one or more beacons. Ranging information is calculated from the IoT pack to the one or more beacons on the basis of the received ultra wide band signals, which are analyzed to determine the location of the IoT pack relative to the geofenced location.

In accordance with some embodiments, the calculated ranging information comprises determining if the IoT pack is located within the geofenced location. On exemplary technique for performing such calculations based on ranging information from the IoT pack to the one or more beacons comprises using Two-Way Ranging ("TWR") to determine the location of the IoT pack Using TWR to determine the location of the IoT pack comprises multiplying the round-trip time of the ultra wide band signals between the IoT pack and a given beacon by the speed of light and then dividing by two.

Finally, embodiments of the present invention are directed towards non-transitory computer readable media comprising program code that when executed by a programmable processor causes execution of a method for detecting entry of an IoT pack into a geofenced location, the computer readable media comprising. The non-transitory computer readable media according to one such embodiment comprises computer program code for broadcasting a Bluetooth inquiry message from a Bluetooth radio that forms a part of an IoT pack and computer program code for energizing an ultra wide band radio that forms a part of the IoT pack and receiving ultra wide band signals from one or more ultra wide band radios that form a part of the one or more beacons upon receipt of one or more responses to the inquiry message from one or more Bluetooth radios that form a part of one or more beacons that are used to demark a geofenced location. In addition the non-transitory computer readable media comprises computer program code for calculating ranging information from the IoT pack to the one or more beacons on the basis of the received ultra wide band signals and computer program code for analyzing the calculated ranging information to determine the location of the IoT pack relative to the geofenced location.

According to some embodiments, the computer program code for analyzing the calculated ranging information comprises computer program code for determining if the IoT pack is located within the geofenced location, which may comprise computer program code for using Two-Way Ranging ("TWR") to determine the location of the IoT pack. The computer program code for using TWR to determine the location of the IoT pack may comprise computer program code for multiplying the round-trip time of the ultra wide band signals between the IoT pack and a given beacon by the speed of light and then dividing by two.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Figure 1:
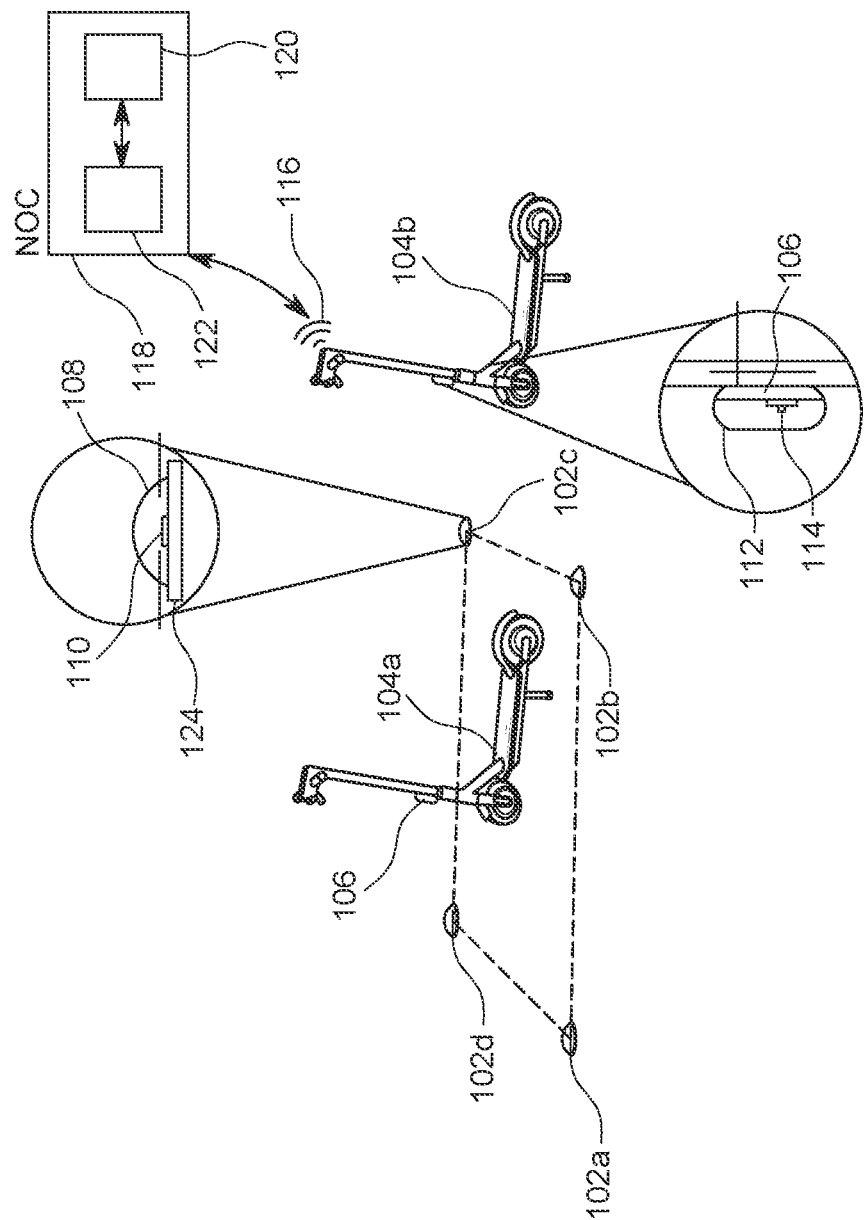
FIG. 1 presents a series of components for demarcating a smart area and tracking of devices entering and leaving the confines of such smart area according to one embodiment of the present invention.

FIG. 1 presents a series of components for demarcating a smart area and tracking of devices entering and leaving the confines of such smart area according to one embodiment of the present invention. As used herein, the term "smart area" refers to a given geographic region or geofenced location that consists of an arbitrary shape and dimensions, which may further include arbitrary volume when taking the z-axis into account. The smart area may be outfitted with a plurality of transmitters and receivers, referred to herein as "beacons", which are used to demark the boundary of the smart area. FIG. 1 presents one such exemplary smart area 100 that is formed in the shape of a rectangle and in which the boundaries of the area are demarked by four beacons, 102a, 102b, 102c and 102d. Because the exemplary smart area 100 is a polygon, its boundaries may be marked by placing beacons 102a, 102b, 102c and 102d at each of its vertices. Those of skill in the art should readily appreciate that smart areas in the form of different or more complex shapes may require more or fewer beacons to demark the given area. All such manner, size and shape of smart areas are contemplated as falling within the scope of the invention.

A beacon 102 in accordance with one embodiment of the present invention is a transceiver outfitted with one or more radios 110 such that it can transmit and receive signals in accordance with one or more transmission protocols that the radio(s) 110 support. Power can be supplied to the beacon 102 through a number of different sources, including battery, solar, and mains power (not pictured). Various embodiments of the invention include the use of multiple redundant power sources, for example, solar cells providing charge to a local batter that powers the radio 110 in a given beacon 102, with hardwired mains power as a backup in the event other power sources fail. The beacon 102 may also comprise a durable outer shell 108 such that it can withstand a variety of environments, as well as a base 116 by which the beacon may be affixed to the ground. Unique screw heads, nuts or locking mechanisms can be used to affix the base 116 to a desired location in a secure manner.

As deployed, the beacons 102a, 102b, 102c and 102d demark points in space, e.g., the location to which a user affixes the beacon. A user, which may be an administrator of one or more smart area, utilizes a computing workstation 122 located at a network operations center ("NOC") to define a smart area 100 on the basis of the location of the beacons 102a, 102b, 102c and 102d that demark its boundary. The user records this information in a data store 118, which his then utilized by devices, e.g., scooters 104a and 104b, to determine entry to and exit from a given smart area 100.

The NOC 118 presented in FIG. 1 includes a server device 122 and database 120. Server 122 may comprise a general-purpose computing device (e.g., personal computers, mobile devices, terminals, laptops, personal digital assistants (PDA), cell phones, tablet computers, or any computing device having a central processing unit and memory unit capable of connecting to a network). Server 122 may also comprise a graphical user interface (GUI) or a browser application provided on a display (e.g., monitor screen, LCD or LED display, projector, etc.), such as a touch-sensitive color 2D or 3D display. Server 122 may store or execute a variety of personal computer operating systems, including Windows, Mac OS or Linux, a mobile operating system, such as iOS, Android, or Windows Mobile, or the like. Server 122 may also include or may execute a variety of possible applications, such as a server software application enabling communication with geographically dispersed IoT packs, thereby allowing for communication of textual content, multimedia content, images, one or more messages, such as via email, short message service ("SMS") or multimedia message service ("MMS") messages, including via a network, such as a social network, including, for example, Facebook, LinkedIn, Twitter, Flickr, or Google+, to provide only a few possible examples.

Server 122 may vary widely in configuration or capabilities, but generally includes one or more central processing units and memory, and may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. In the illustrated embodiment, Server 122 includes a connection to a data store 120, e.g., an RDBMS or NoSQL data store. Data store 120 may comprise mass storage, such as network attached storage ("NAS"), access to a storage area network ("SAN"), or other forms of computer or machine-readable media for storing data. Data that the data store 120 maintains includes, but is not limited to, administrative information, user data and account information, beacon locations, the geographic locations of various geofenced smart areas that are enabled by the beacons disclosed here, information regarding one or more deployed IoT packs and/or personal transport devices to which such IoT packs may be affixed, e.g., power levels, location, rental status, etc.

In one exemplary use-case, a given smart area 100, demarcated by four beacons 102a, 102b, 102c and 102d, defines a parking space for a personal transport device, e.g., an electric scooter 104a. To determine the location of the personal transport device and whether it is inside or outside of a smart area 100, the personal transport device is equipped with an "IoT pack" 106 operative to communicate with one or more of the beacons 102a, 102b, 102c and 102d through the exchange of one or more messages over a transmission link provided by their radios, 114 and 110, respectively. The IoT pack 106, which is explained in greater detail herein, is affixed to body or frame of the personal transport device, 104a and 104b, may encase one or more radios 114 within a durable outer shell 114, which is particularly useful when the IoT pack 106 is expected to the elements. The radio(s) 114 in the IoT pack 106 can transmit and receive signals in accordance with one or more transmission protocols that the radio(s) 114 support.

A given personal transport device 104a and 104b is provided with a link to the NOC 118 over a wide area network 116. The connection to the wide area network 116 may be provided by a wide area network radio that is deployed as a component of the IoT pack 106. Alternatively, the IoT pack 106 can initiate a local or personal network connection with a mobile device that a user provides, e.g., over an 802.11 or Bluetooth link, and then using the wide area network connection that the mobile device provides. In either event, the IoT pack 106 maintains a connection back to the NOC 118 over which over which the NOC 118 and IoT pack 106 can exchange data and commands.

The wide area network 116 may be any suitable type of network allowing transport of data communications across thereof. The network 116 may couple the NOC with one or more IoT packs deployed on one or more personal transport devices so that communications may be exchanged. In one embodiment, the network may be the Internet, following known Internet protocols for data communication, or any other communication network, e.g., any local area network (LAN), or wide area network (WAN) connection, wire-line type connections, wireless type connections, or any combination thereof. A connection to the Internet may be made in accordance with wireless transmission protocols, such as GPRS and LTE.

Advantageously, embodiments of the invention comprise the use of Ultra Wide Band ("UWB") radios, 114 and 124, located at both the beacon 102 and the IoT pack 106. In this regard, smart area implementation is based on the utilization of UWB signals from a plurality of beacons to implement the trilateration algorithm. UWB is a radio technology based on the IEEE 802.15.4a and 802.15.4z standards that enables extremely accurate measure of the Time of Flight ("ToF") of a given radio signal, leading to centimeter accuracy distance/location measurement. Embodiments utilize ToF of one or more UWB signals to implement a technique for measuring the distance between two radio transceivers by multiplying the time of flight of a given signal by the speed of light. From this basic principle, UWB technology can be implemented in different ways based on the target applications needs: Two Way Ranging, Time Difference of Arrival ("TDoA"), or Phase Difference of Arrival ("PdoA").

One embodiment of the present invention uses Two-Way Ranging ("TWR") to determine the location of the IoT pack and the personal transport device to which it is affixed, which relies on two-way communication between two devices. As the two devices communicate and pass messages therebetween, the devices also measure the Time of Flight of the UWB RF signal between the two. By multiplying the round-trip time of the signal by the speed of light, and then dividing by two (2), a determination as to the actual distance between the two devices can be made.

When a determination needs to be made that the IoT pack or personal transport device to which it is affixed is within a smart area, the microprocessor 204 at the IoT pack measures the distance from the UWB transceiver located in which beacon that is being used to demark the given smart area. According to the present embodiment the IoT pack detects and measures the distance to UWB transceivers located in at least three (3) beacons. The microprocessor then applies a trilateration algorithm in two cartesian dimensions, as shown in FIG. 7.

Figure 7:
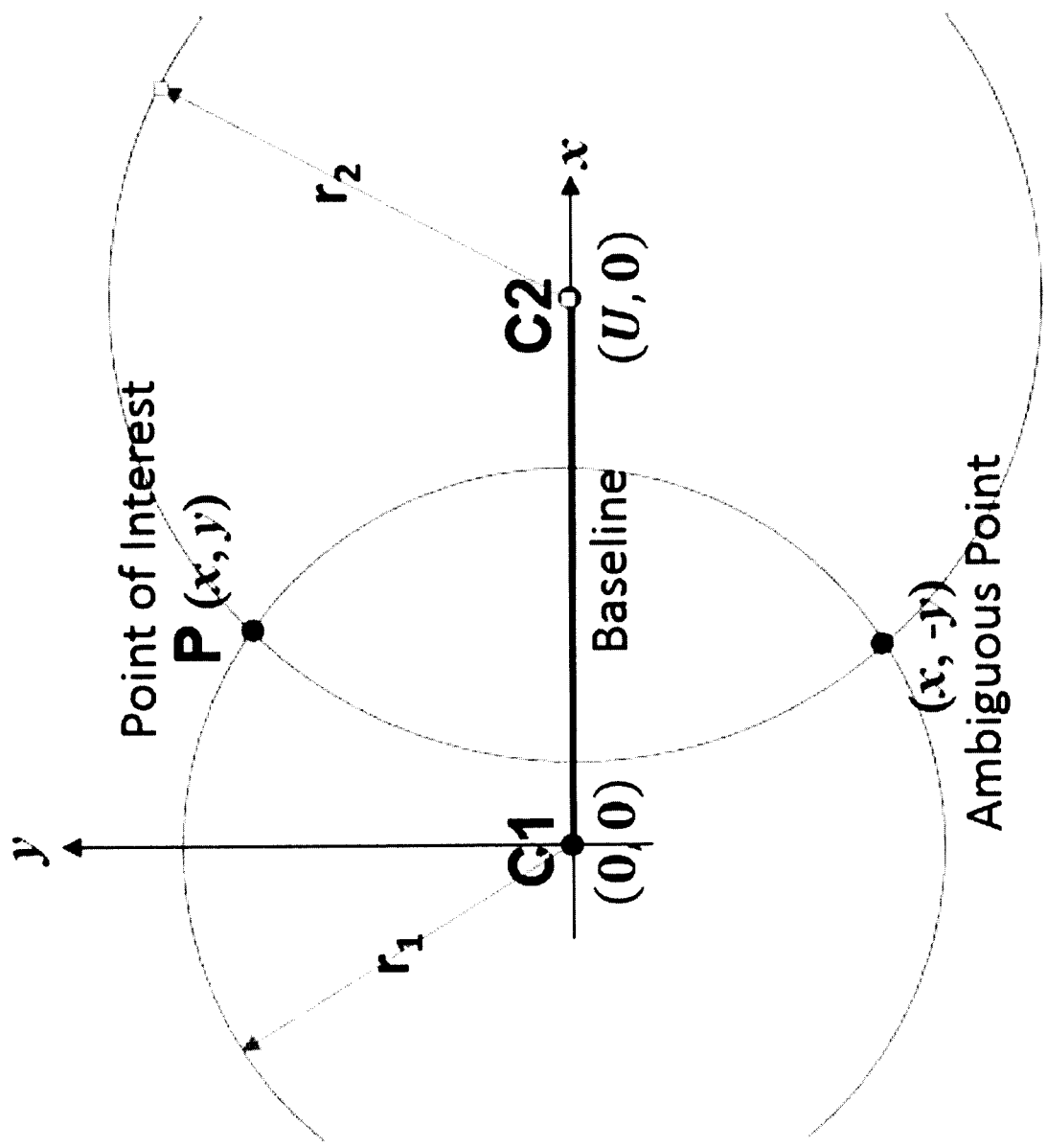
FIG. 7 is a diagram for illustrating a trilateration algorithm applied in two cartesian dimensions according to certain aspects of the present disclosure.

Consider the circle centers (or beacons) C1 and C2 in FIG. 7 that have known coordinates. If a third point of interest "P" appears at unknown point, then Pythagoras's theorem yields:

$$r_1^2 = x^2 + y^2 \text{ and } r_2^2 = (U-x)^2 + y^2$$

thus $$x = \frac{r_1^2 + r_2^2 + U^2}{ZU} \text{ and } y = \pm\sqrt{r_1^2 - x^2}$$

Figure 8:
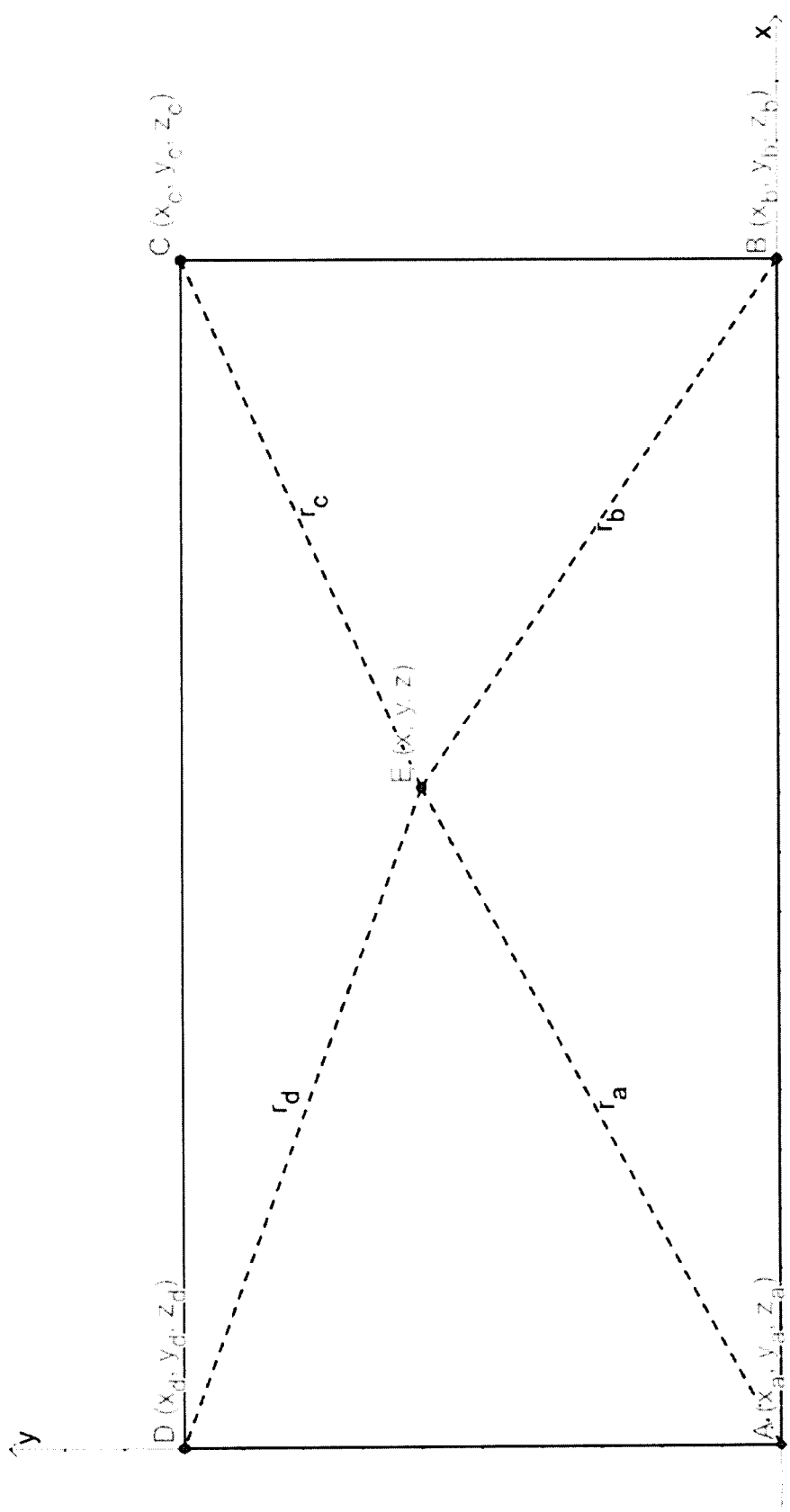
FIG. 8 is a plot of a top down projection of a hypothetical smart area for illustrating aspects of the present disclosure.

Building upon the foregoing mathematics, consider the plot shown in FIG. 8 in which a top down projection of a hypothetical smart area is presented, such as a smart parking spot.

In the depicted example of FIG. 8, points A, B, C and D represent beacons that are placed on a same or similar plane where:

$$z_a = z_b = z_c = 0 \quad \text{[Eq. 1]}$$

Taking a given point as the start of our coordinate system, e.g., point A, therefore:

$$x_a = y_a = z_a = 0 \quad \text{[Eq2]}$$

Given a point E, three (3) spheres can be drawn such that their center points are at A, B, and C, respectively, and where their surface contains point E. Radii of these spheres will then be calculated as:

$$r_a = x^2 + y^2 + z^2 \quad \text{[Eq 3]}$$

$$r_b = (x-x_b)^2 + y^2 + z^2 \quad \text{[Eq 4]}$$

$$r_c = (x-x_c)^2 + (y-y_c) + z^2 \quad \text{[Eq 5]}$$

Since we have these radii through UWB measuring (taking the median measurement of all measurements done each second), the above equations can be simplified to arrive at the following:

$$x = \frac{r_a^2 - r_b^2 - x_b^2}{2x_b} \quad \text{[Eq. 6]}$$

$$x = \frac{r_a^2 - r_b^2 + x_c^2 + y_c^2 - 2x_c x}{2y_c} \quad \text{[Eq. 7]}$$

$$z = \sqrt{r_a^2 - x^2 - y^2} \quad \text{[Eq.8]}$$

This gives us the point of the tracked device in 3D space, which may be useful in the context of a number of use-cases in which embodiments of the invention may be applied. In the case of using smart areas as a parking spot, such methodologies are primarily interested in x and y coordinates, which therefore does not require calculation of the z coordinate in many situations.

When using four (4) beacons, for example, provides the opportunity to calculate the position using four (4) disparate triangles (ABC, BCD, CDA, DAC). This in turn provides an opportunity to precisely calculate the coordinates of an object, such as a personal transport device or even just the IoT pack itself, even if one of the beacons fails. Also, performing multiple calculations with different combinations of beacons provides the additional opportunity to more easily detect interference that might form a part of incoming signals. For example, where the difference between calculations is beneath the given threshold, the microprocessor may be programmed to find the average between those points and accept such calculation as a valid measurement. If one or more points are greater than or otherwise exceed the set threshold away from the closest other point, the microprocessor may be programmed to calculate, apply or otherwise perform an interference correction algorithm, such as any one of the interference correction algorithms well known to those of skill in the art.

In addition to the foregoing, by knowing the relative height that should be provided as an input to the set of equations shown above, the microprocessor can approximate which of the calculations is the most precise, e.g., by calculating the z-value for each of the calculations and checking which one is closest to the real value. This is a relatively trivial task when dealing with a uniform set of personal transportation devices in which the IoT pack is affixed at a known location on the device at a known height. Ultimately, this allows for identification of the beacon that is the source of any observed interference, e.g., the one not included in the most precise measurement).

As indicated above, a given personal transport device 104a and 104b is provided with a link to the NOC 118 over a wide area network 116 that the NOC 118 and IoT pack 106 can use to exchange data and commands. For example, where the IoT pack 106 is affixed to an electric scooter that users rent on a time and/or distance basis, the NOC 118 may be operative to transmit authorization and deauthorization messages to the IoT pack 106, as well as receive usage information from the IoT pack 106 to properly meter and charge a give user session. Commands from the NOC 118 may further instruct the personal transport device 104a and 104b to engage one or more interlocks (discussed in greater detail herein) on the basis of device state and location, e.g., engage the brake and disengage power to the one or more motors when the personal transport device 104a is located within the boundaries of a smart area 102a, 102b, 102c and 102d, and the user ends his or her current session. Those of skill in the art recognize that additional data, commands, parameters, telemetry, etc. may be passed between the NOC 118 and IoT pack 106 over the WAN connection 116, which may also comprise storage of such data in the data store 120, as well as the calculation of statistics on the basis thereof, including usage statistics.

Figure 2:
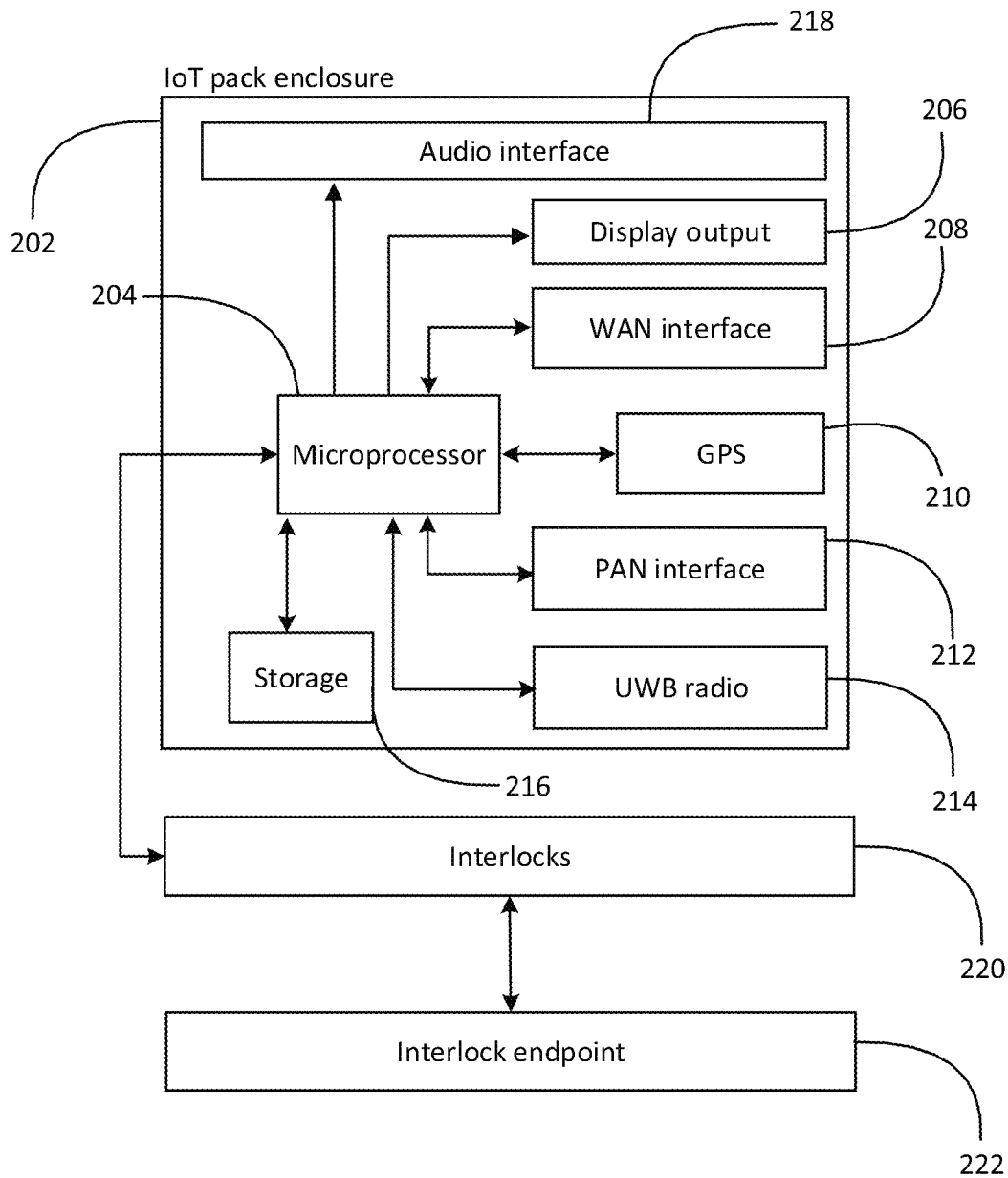
FIG. 2 presents a block diagram illustrating hardware components of an IoT pack and personal transport device according to one embodiment of the present invention.

FIG. 2 presents a block diagram illustrating hardware components of an IoT pack and personal transport device according to one embodiment of the present invention. In accordance with the embodiment of FIG. 2, components comprising the IoT pack are encapsulated or enclosed within a shell or similar enclosure 202. At the heart of the IoT pack is a microprocessor 204 that is in communication with a storage medium 216 that is operative to maintain program code for execution by the microprocessor 204. According to one embodiment, the microprocessor 204 is selected from the Qualcomm Snapdragon 4 Series of mobile processors implementing the ARM architecture. Storage 216 may comprise a selection of any number of electronically erasable programmable read-only memory ("EEPROM"), including flash memory, which is a type of EERPOM designed for high-speed and high-density at the expense of large erase blocks and a limited number of write cycles.

A user on a personal transport device or who otherwise requires interaction with the IoT pack 202 may interface the microprocessor 204 and storage 216 via a display (not pictured) that may interface with the display output 206 on the IoT pack 202. The IoT pack 202 may also provide a user with a variety of audio signals and/or cues by the microprocessor sending audio data to a speaker (not pictured) that is in connection with the audio interface 218. The microprocessor 204 may send data to the audio interface 218 and the display output 206 on the basis of instructions that it processes when executing program code that it retrieves from storage 216, as well as when executing commands that it receives from remote locations over a wide area network, such as the NOC.

Regarding the execution of remotely received commands, the receipt of such data may be accomplished by maintaining a connection to a wide area network by way of a wide area network ("WAN") interface 208, e.g., 802.11, 3G or 4G cellular network interface, etc., that may be provided as part of the IoT pack 202. Alternatively, or in conjunction with the foregoing, the IoT pack 202 may be provided with an interface to a personal area network ("PAN") 212, e.g., Bluetooth, that allows the IoT pack 202 to communicate with, for example, the cellular phone of a user that opens a Bluetooth connection to the IoT pack 202, which may then provide the IoT pack 202 with a connection to a wide area network, e.g., 802.11, 3G or 4G cellular networks, etc.

In addition to the foregoing, the IoT pack 202 may comprise a connection to one or more physical or virtual keyboards, one or more cameras, one or more accelerometers, one or more gyroscopes, an interface to the global positioning system ("GPS") 210 or other location identifying type capability, e.g., GLONASS, Galileo, etc., or a display with a high degree of functionality, such as a touch-sensitive color 2D or 3D display. The IoT pack may include or execute one or more operating systems, such as Linux, Windows Embedded, or similar embedded OS, or a mobile operating system, such as iOS, Android, or the like.

The microprocessor 204 running at the IoT pack 202 may also execute a variety of possible applications from storage 216 or over the WAN or PAN interfaces, 208 and 212 respectively, such as a client software application enabling communication with other devices, receiving and displaying textual content, multimedia content, images, one or more messages, such as via email, short message service (SMS), or multimedia message service (MMS), including via a network, such as a social network, including, for example, Facebook, LinkedIn, Twitter, Flickr, or Google+, to provide only a few possible examples.

The IoT pack 202 is in electrical communication with components external to the IoT pack itself, including a power source (not pictured) and one or more interlocks 220 that might be present on a personal transport device to which the IoT pack is affixed. An interlock is a feature on a personal transport device that makes the state of two mechanisms or functions mutually dependent. An interlock may be used, for example, to prevent undesired states in a finite state machine and may comprise any combination of electrical and mechanical systems. In relation to personal transport devices, an interlock is used to help prevent the machine from harming the operator or engaging in unauthorized use by preventing one element from changing state due to the state of another element and vice versa. The interlocks 220 are in communication with one or more interlock endpoints 222, which are the specific electrical and/or mechanical subsystems that are enabled, disabled or otherwise modified on the basis of instructions that a given interlock 220 receives from the microprocessor 204.

To accomplish ranging and location determination, the IoT pack 202 is equipped with a UWB radio 214 that allows it to engage in UWB communications with UWB radios located in one or more beacons that define the bounds of a smart area. As described above, the UWB radio in the IoT pack engages in ToF ranging to determine its location in 3D space. Based on this determination, program code from storage or the NOC that the microprocessor executes can cause any number of responses. For example, when the IoT pack is attached to a personal transport device, entry of the device into a given smart area may represent the end of a session, thereby causing the microprocessor to instruct an interlock to engage, which results in the transmission of signals to one or more interlock endpoints 222, for example, causing the device to deploy a kickstand and disengage the motors to avoid accidental unauthorized acceleration of the device.

Figure 3:
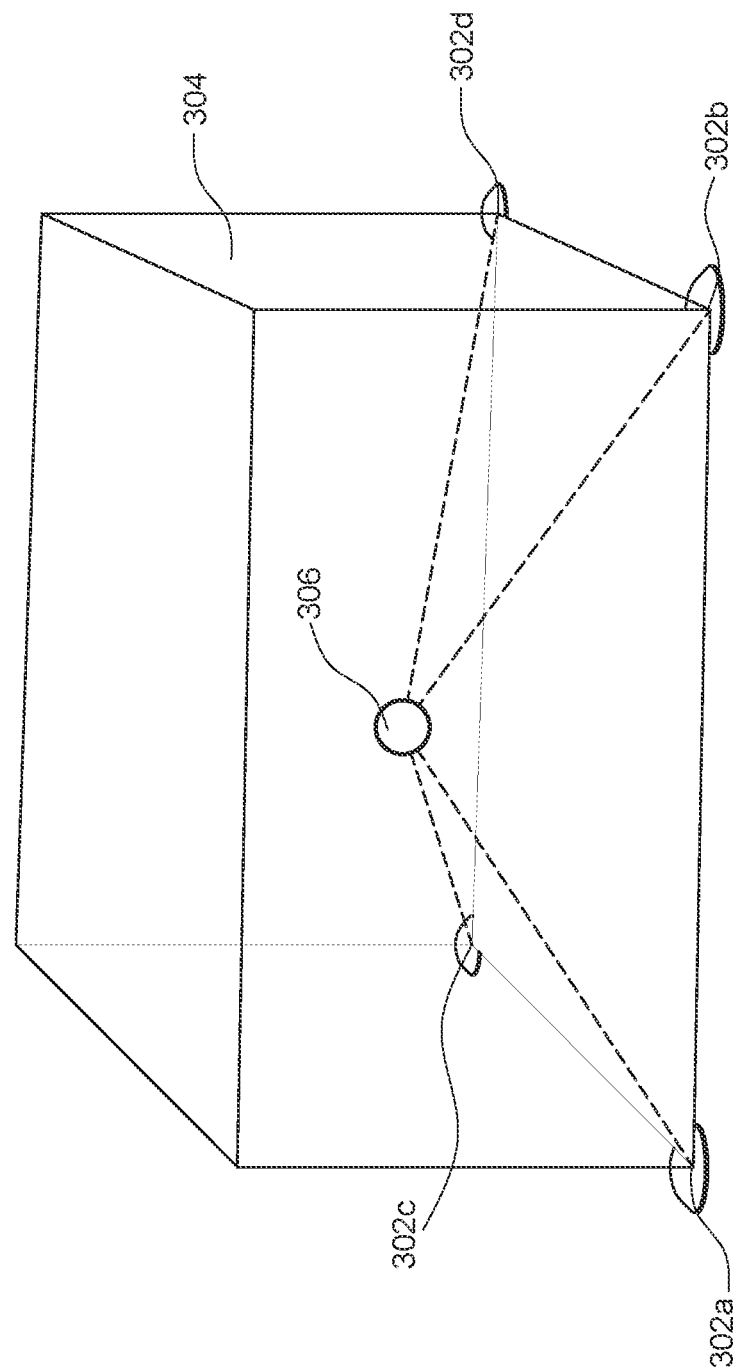
FIG. 3 presents a series of hardware components used for trilateration of an object within a given smart area according to one embodiment of the present invention.

Turning to FIG. 3, the UWB radio disposed of within the IoT pack is at a given location in 3D space 306 and engages in UWB ranging and calculating the ToF of signals received from various beacons 302a, 302b, 302c and 302d that define a given smart area 304. The microprocessor in the IoT pack calculates ToF of the incoming signals, which allows it to therefore determine its location 306 in 3D space. The ability to perform accurate, fine grained location calculations allows the IoT pack to know its location vis-à-vis the beacons with which it is in communication, e.g., inside or outside the bounds of a smart area.

Figure 4:
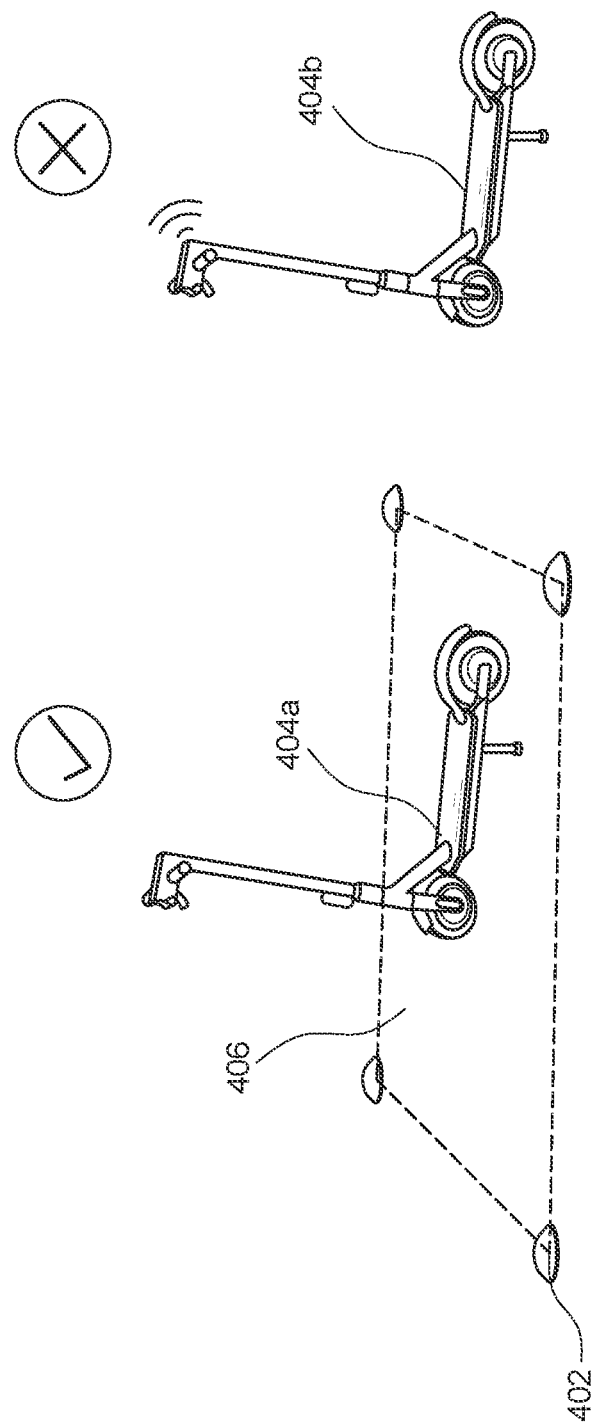
FIG. 4 presents tracking entry of a device into a smart area according to one embodiment of the present invention.

Such functionality may be extremely useful in the rental personal transportation device market segment in which it is critical that rented personal transportation devices be returned to authorized parking areas. By use of the systems and methods of the present invention, smart areas can be defined to automate the return process. FIG. 4, For example, presents tracking entry of a device into a smart area according to one embodiment of the present invention. Depicted are two personal transportation devices, each equipped with an IoT pack that is in UWB communication with one or more beacons 402 that define a smart area 406, in this case a parking area for the return of rental electric scooters, 404a and 404b.

A given one of the personal transportation devices, 404a and 404b, are in UWB communication with the beacons that define a smart area 406. The microprocessor in a given one of the IoT packs affixed to the personal transportation device, 404a and 404b, is operative to calculate entry to and egress from the smart area 406 based on the signals the UWB radio in the IoT pack receives from the beacons 402. When a user wishes to perform a given context relevant action, such as returning a rental electric scooter and ending a given session, the microprocessor in the IoT pack only processes the return subsequent to calculating or otherwise determining that the personal transport device 404a is within the bounds of the smart area. Where the device is outside the smart area or otherwise not in a valid location to perform an action that the user desire, e.g., 404b, processing is suspended until the microprocessor determine that the personal transportation device is within the smart area. Accordingly, all manner of location-based processing or functionality that requires highly accurate, fine grained location information is enabled by the present invention.

Figure 5:
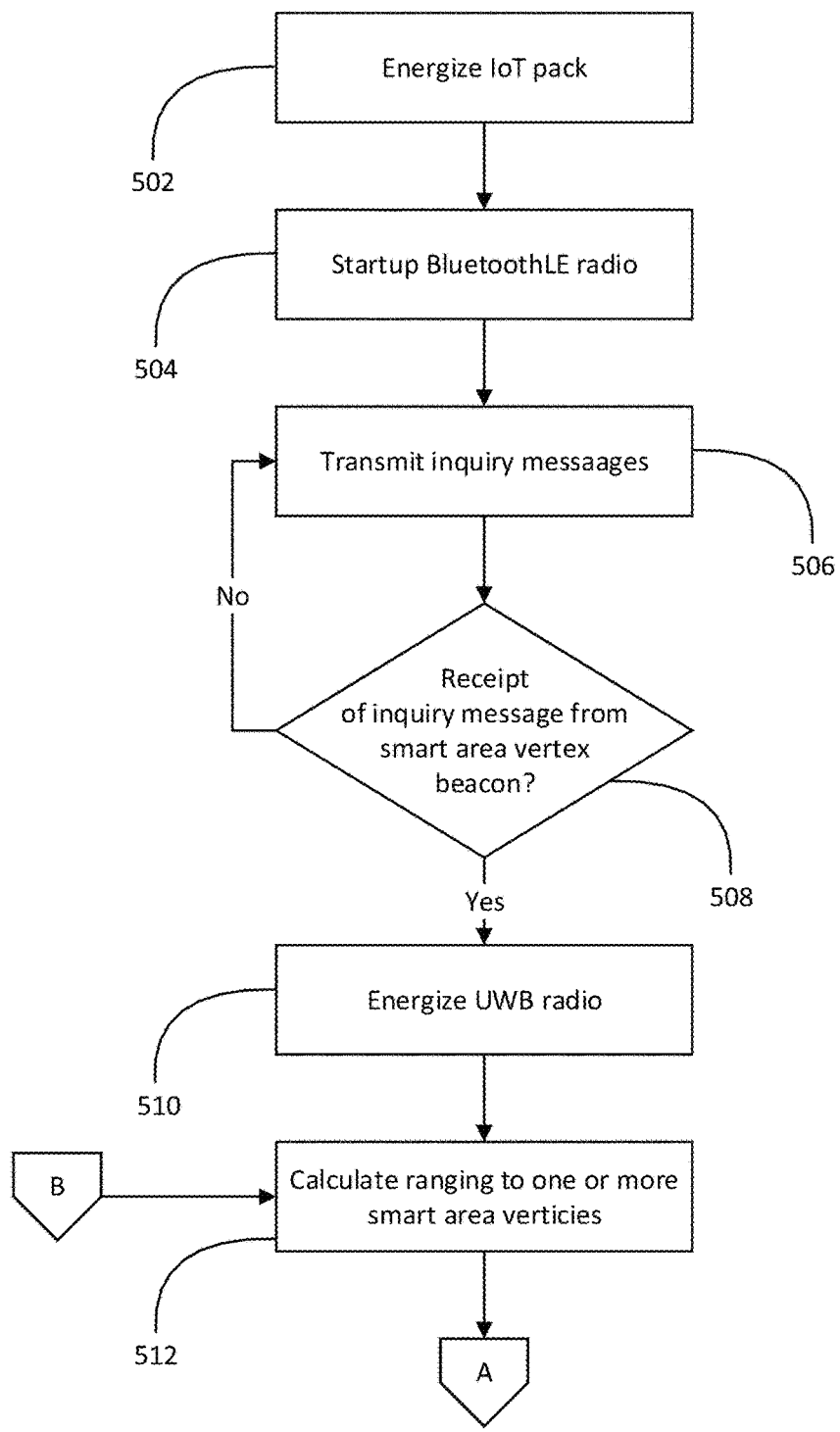
FIG. 5 presents the first part of a flow diagram that illustrates tracking entry of a device into a smart area according to one embodiment of the present invention.
Figure 6:
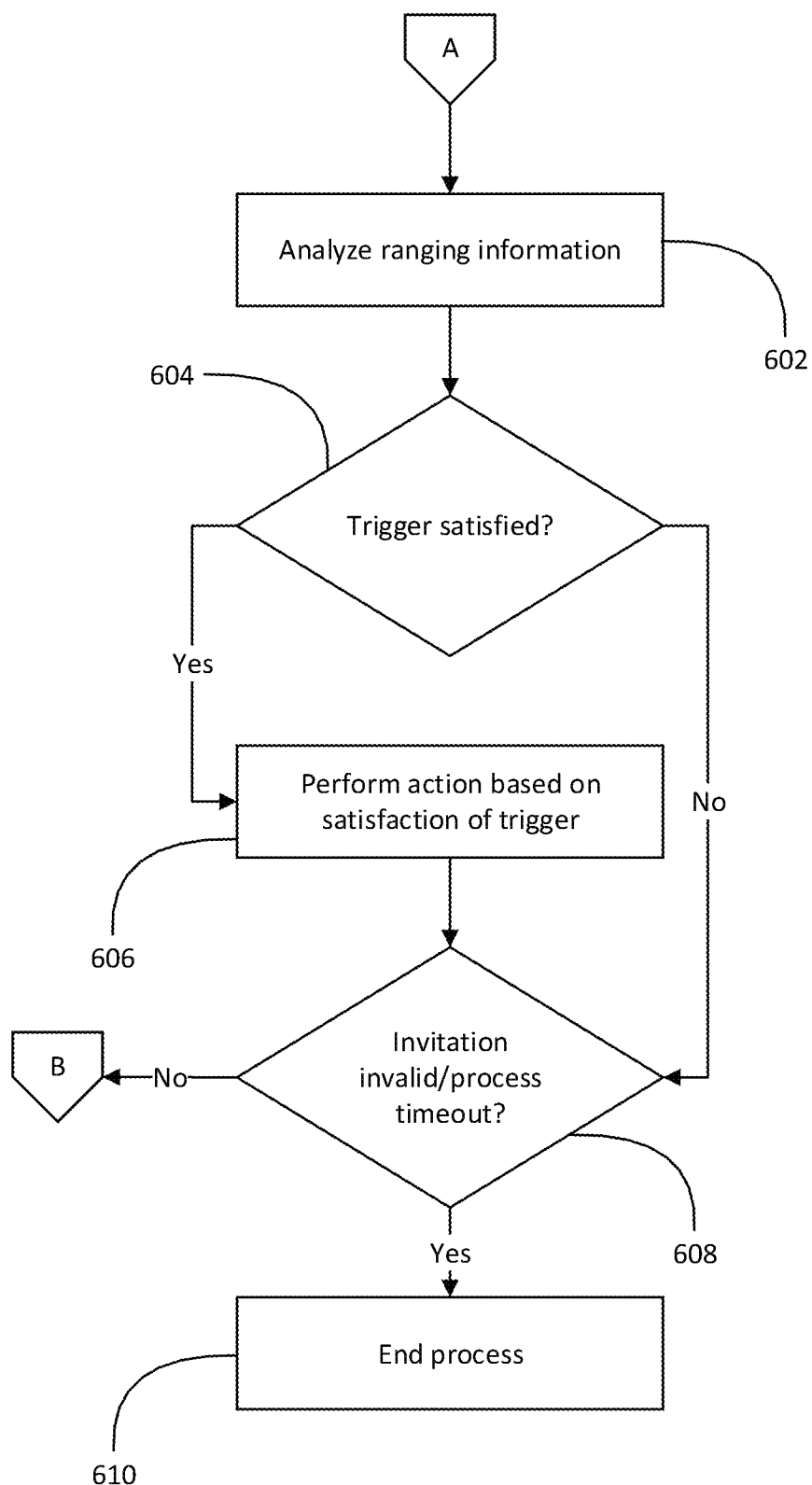
FIG. 6 presents the second part of a flow diagram that illustrates tracking entry of a device into a smart area according to one embodiment of the present invention.

Building upon the foregoing, FIGS. 5 and 6 present the first and second parts, respectively, of a flow diagram that illustrates tracking entry of a device into a smart area according to one embodiment of the present invention. The process begins at FIG. 5 with a power source in electrical communication with the IoT pack energizing or otherwise providing power to the components comprising the IoT pack, step 502. Power source to energize the IoT pack can be provided from one or more sources including, but not limited to, rechargeable batteries, solar cells, kinetic power, etc. According to the embodiment of FIG. 5, energizing the IoT pack further comprises providing power to and conducting the initialization boot up sequence of a Bluetooth radio deployed as part of the IoT pack, step 504, which may further comprise the use of a Bluetooth LE radio.

Subsequent to startup of the IoT pack and components comprising a part thereof, step 502 and 504, the Bluetooth radio initiates the transmission of inquiry messages, step 506, and awaits the receipt of an inquiry message from a vertex beacon deployed to demarcate the boundaries of a given smart area, step 508. Accordingly, a microprocessor commands the Bluetooth radio at the IoT pack to enter the inquiry state as a "master" and begins message transmission using 16 of the 32 channels for inquiries. During every even number slot, the Bluetooth radio transmits to ID packets on two different channels, listing during the following slot on those same two channels for a response from a slave (a frequency hopping sequence ("FHS") packet). Where the radio does not receive a response, it uses the next two channels.

A given beacon, by contrast with the radio at the IoT pack, is in a "slave" sate and, being unconnected Bluetooth device, wants to be discovered by a master device. Accordingly, the Bluetooth radio at a given beacon periodically enters the inquiry scan state in which it activates its receiver and listens for inquiries. In accordance with the defined protocol, the Bluetooth radio must enter this state at least every 2.56 seconds (4096 slots). During the inquiry scan state, the unconnected device listens on one of 32 channels, for at least 10 ms (16 slots). A different channel is selected every 1.28 seconds (2048 slots). The channels and the hopping sequence are calculated from the general inquiry address.

Where the Bluetooth radio at the IoT pack does not receive a response to the inquiry messages that it's transmitting, step 508, program flow returns to step 506 with the Bluetooth radio continuing to transmit inquiry messages, essentially looking for a response that indicates the presence of or proximity to a beacon that demarks the boundary of a smart area. Where a slave device responds indicating receipt of an inquiry message that the Bluetooth radio at the IoT pack (master) broadcasts, e.g., the check at step 508 evaluates to true, the microprocessor energizing or otherwise initiating the provision of power to the UWB radio, which may be integrated into the IoT pack or located externally in electrical communication with the microprocessor and other hardware components comprising the IoT pack, step 510. More specifically, when the check at step 508 evaluates to true, the IoT pack is within range of a smart area and must therefore begin calculating location with high precision.

Upon completion of its initialization routine, the UWB radio working in conjunction with the IoT pack begins to receive UWB signals from one or more UWB radios located in one or more beacons that are used to demark the boundaries of a given smart area. The microprocessor calculates ranging to one or more of the beacons on the basis of the UWB signals that that UWB radio at the IoT pack sends and receives, step 512. Processing continues at FIG. 6 with the microprocessor applying the techniques described herein to analyze the ranging information that the microprocessor is receiving from the UWB radio, step 602.

The microprocessor, executing program code that it retrieves from local or remote storage, determines on the basis of its analysis if it is located within the boundary of the smart area, the basis of the result of such evaluation considered a trigger for further events to occur downstream, step 604. For example, a trigger may be simple as determining on the basis of the calculated location of the IoT pack that it is within the boundary of the smart area. More complex triggers may comprise layer subsequent requirements that must be met prior to firing any defined action(s). Upon satisfaction of the trigger, step 604, the microprocessor may perform and action, step 606, for example, communicating with the NOC and/or application on a user mobile device, which can result in still further downstream processing, e.g., termination of a rental session and engaging one or more interlocks on a personal transportation devices on which the IoT pack is installed.

In situations where the trigger is not satisfied, step 604, or subsequent to any processing that the microprocessor might perform in response to satisfaction of a trigger, step 606, program flow is directed to step 608 where the microprocessor performs a further check to determine if either a received invitation is invalid or the process has entered a timeout state. The check at step 608 may evaluate to true, for example, in situations where the IoT pack came within range of a smart area but never entered the smart area, or where IoT pack enters the smart area and completes any processing, step 606, associated with satisfaction of the trigger, step 604. In those situations where the check at step 608 evaluates to true, program flow is directed towards step 610 and the process concludes, which may comprise deactivation of the UWB radio to conserve limited power and computing resources. Alternatively, where the process has not yet timed out, step 608, program flow is directed back to FIG. 5 with the UWB radio continuing to receive signals that the microprocessor uses to calculate ranging to the one or more beacons from which it is receiving UWB signals.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory ("RAM"); a read only memory ("ROM"); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for setting a state of an interlock on a personal transport device, the system comprising: a plurality of beacons arranged along the perimeter of a geofenced location, the plurality of beacons operative to transmit a-Bluetooth-inquiry messages over a Bluetooth radio and ultra-wide band signals over an ultra-wide band radio; an IoT pack affixed to a body of the personal transport device, the IoT pack comprising: a Bluetooth radio adapted to receive an inquiry message from at least one of the plurality of beacons; a processor; and an ultra-wide band radio to which provision of power is controlled by the processor, the processor initiating the provision of power to the ultra-wide band radio upon receipt of the inquiry message by the Bluetooth radio and the ultra-wide band radio being adapted to, upon the initiating of the provision of power, receive the ultra-wide band signals from one or more of the plurality of beacons and determine its location on the basis thereof relative to the geofenced location; and a network operations center ("NOC") operative to transmit one or more commands to the IoT pack on the basis of at least the results of the location determination and the state of the interlock; wherein the state of the interlock on the personal transport device is set by the IoT pack in accordance with the commands received from the NOC such that corresponding interlock endpoints are engaged or disengaged on the basis of the commands.

2. The system of claim 1 wherein a given one of the plurality of beacons comprises: a base by which to affix the given beacon to a surface; a durable enclosure that defines an internal volume for the storage of one or more electrical and mechanical components; one or more radio transceivers disposed of within the internal volume of the durable enclosure; and a power source to energize the one or more radios.

3. The system of claim 1 wherein the geofenced location is a polygon and the plurality of beacons are arranged at the vertices of the geofenced location.

4. The system of claim 1 wherein the IoT pack disengages the ultra-wide band radio after expiration of a timeout period.

5. The system of claim 1 wherein the processor is a programmable processor, and the IoT pack further comprises: a storage device; and program code retrievable from the storage device and executable by the programmable processor to determine the location of the IoT pack relative to the geofenced location on the basis of the received ultra-wide band signals from one or more of the plurality of beacons.

6. The system of claim 5 wherein the processor executes program code to perform an action in response to determining the location of the IoT pack relative to the geofenced location.

7. The system of claim 5 wherein the processor executes program code to perform an action in response to determining that the IoT pack has entered the geofenced location.

8. A method for setting a state of an interlock a personal transport device, the method comprising: broadcasting a Bluetooth inquiry message from a Bluetooth radio that forms part of an IoT pack that is affixed to a body of the personal transport device; upon receipt of one or more responses to the Bluetooth inquiry message from one or more Bluetooth radios that form a part of one or more beacons that are used to demark a geofenced location, initiating, by a processor, provision of power to an ultra-wide band radio said processor and said ultra-wide band radio forming respective parts of the IoT pack receiving, by the ultra-wide band radio upon the initiating of the provision of power, ultra-wide band signals from one or more ultra-wide band radios that form a part of the one or more beacons; calculating ranging information from the IoT pack to the one or more beacons on the basis of the received ultra-wide band signals; analyzing the calculated ranging information to determine the location of the IoT pack relative to the geofenced location; receiving, by the IoT pack, one or more commands from a network operations center ("NOC") on the basis of at least the results of the location determination and the state of the interlock; and setting the state of the interlock on the personal transport device by the IoT pack in accordance with the commands received from the NOC whereby corresponding interlock endpoints are engaged or disengaged on the basis of the commands.

9. The method of claim 8 wherein analyzing the calculated ranging information comprises determining if the IoT pack is located within the geofenced location.

10. The method of claim 8 wherein calculating ranging information from the IoT pack to the one or more beacons comprises using Two-Way Ranging ("TWR") to determine the location of the IoT pack.

11. The method of claim 10 wherein using TWR to determine the location of the IoT pack comprises multiplying the round-trip time of the ultra-wide band signals between the IoT pack and a given beacon by the speed of light and then dividing by two.

12. Non-transitory computer readable media comprising program code that when executed by a programmable processor causes execution of a method for setting a state of an interlock on a personal transport device, the computer readable media comprising: computer program code for broadcasting a Bluetooth inquiry message from a Bluetooth radio that forms part of an IoT pack that is affixed to a body of the personal transport device; computer program code for initiating, by a processor, provision of power to an ultra-wide band radio-upon receipt of one or more responses to the Bluetooth inquiry message from one or more Bluetooth radios that form a part of one or more beacons that are used to demark a geofenced location, said processor and said ultra-wide band radio forming respective parts of the IoT pack computer program code for receiving, by the ultra-wide by radio upon the initiating of the provision of power, ultra-wide band signals from one or more ultra-wide band radios that form a part of the one or more beacons; computer program code for calculating ranging information from the IoT pack to the one or more beacons on the basis of the received ultra-wide band signals; computer program code for analyzing the calculated ranging information to determine the location of the IoT pack relative to the geofenced location; computer program code for receiving, by the IoT pack, one or more commands from a network operations center ("NOC") on the basis of at least the results of the location determination and the state of the interlock; and computer program code for setting the state of the interlock on the personal transport device by the IoT pack in accordance with the commands received from the NOC whereby corresponding interlock endpoints are engaged or disengaged on the basis of the commands.

13. The computer program code of claim 12 wherein the computer program code for analyzing the calculated ranging information comprises computer program code for determining if the IoT pack is located within the geofenced location.

14. The computer program code of claim 12 wherein the computer program code for calculating ranging information from the IoT pack to the one or more beacons comprises computer program code for using Two-Way Ranging ("TWR") to determine the location of the IoT pack.

15. The computer program code of claim 12 wherein the computer program code for using TWR to determine the location of the IoT pack comprises computer program code for multiplying the round-trip time of the ultra-wide band signals between the IoT pack and a given beacon by the speed of light and then dividing by two.

\* \* \* \* \*